L. CHANDOR.
Making Alkalies.
No. 39,213.
Patented July 14, 1863.
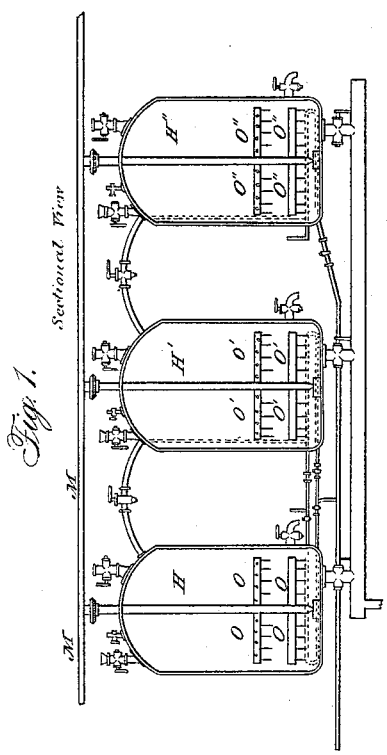
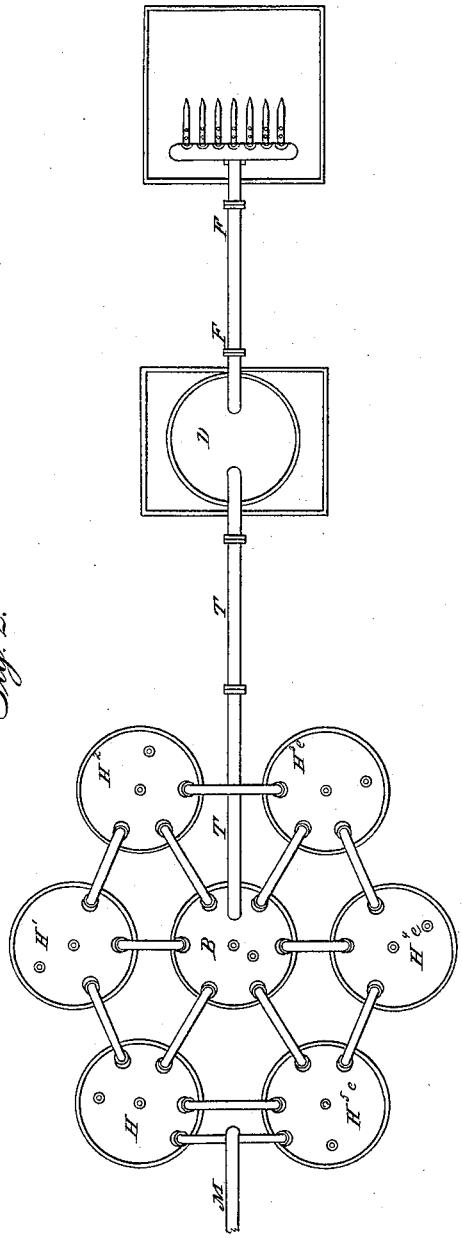
Witnesses:
L. J. Gordon
Geo. H. Collins
Inventor:
L. Chandor

UNITED STATES PATENT OFFICE.

LASSLO CHANDOR, OF NEW YORK, N. Y.

IMPROVEMENT IN THE MANUFACTURE OF ALKALINE CARBONATES.

Specification forming part of Letters Patent No. 39,213, dated July 14, 1863.

*To all whom it may concern:*

Be it known that I, LASSLO CHANDOR, of the city, county, and State of New York, have discovered a new and useful process for the manufacture of carbonate of soda and potash by the use of sulphurets of sodium and potassium; and I do hereby declare that the following is a full, clear, and exact description of said process, reference being had to the accompanying drawings, making a part of this specification, and the letters of reference marked thereon, in which the same letter represents the same thing in each figure.

The object of this new process is to manufacture carbonate of potash and carbonate of soda by the use of sulphurets of potassium and sodium. As the method is the same for both, I will describe the mode of working for the manufacture of carbonate of soda.

None of the many previous patents in this branch of the arts have attained results sufficiently satisfactory to induce a regular manufacture. Instead of carbonate of soda, the results were almost always hyposulphites of soda. This process will offer great advantages over the actual manufacture of artificial soda, and restore to the trade the almost entire amount of sulphuric acid hitherto lost in the processes in use. Sulphuret of sodium alone in presence of an excess of carbonic acid only gives rise to a feeble production of bicarbonate of soda, while, on the other hand, a large quantity of hyposulphite of soda as surely results. In order that the sodium of the sulphuret may combine with the carbonic acid injected into the solution, there must be present an oxidized agent capable of absorbing the sulphohydric acid directly it is formed —that is to say, at its first appearance, by giving up its oxygen in turn to the sodium, the latter, then passing into a state of soda, combines with the greatest ease with the carbonic acid and forms a solution of bicarbonate of soda. Calcination in the reverberatory furnace transforms the latter salt into the neutral carbonate of soda. The agent employed in the oxidation of the soda is lime. Cream of lime introduced into the solution of the monosulphuret of sodium absorbs the sulphohydric acid, or, rather, the sulphur of the sulphuret of sodium, to form, as in the manufacture of soda, an oxysulphuret of calcium. The following is the reaction: $2N_aS + 3C_aO + 4CO^2 = 2(N_aO, 2CO_2) + C_aO2C_aS$; but the reaction divides itself into two almost as soon as formed, and the excess of carbonic acid required for the production of the bicarbonate of soda, reacting in its turn after the production of the latter upon the oxysulphuret of calcium formed, transforms it into carbonate of lime while setting free the sulphohydric acid, $C_aO2C_aS + 3CO^2 + 2HO = 3(C_aO,CO_2) + 2HS$.

The sulphohydric acid, by its combustion in a medium filled with oxygen—that is to say, in a large volume of air—is transformed into sulphurous acid and water, which is introduced into the leaden chambers, where, by the ordinary process, the sulphurous acid is transformed into sulphuric acid. In order to effect the regular combustion of the sulphohydric acid, it is first collected in a receiver or gasometer, so as from thence to be carried for subjection to a feeble pressure in the combustion-furnaces of iron pyrites, almost exclusively used nowadays in the manufacture of sulphuric acid.

In order to obtain a complete combustion of the sulphohydric acid, it is made to pass by means of small jets before a row of gas-lights, composed of some fifteen to twenty burners, which regularly cast the current of acid over the pyrites in combustion. This arrangement permits sulphohydric acid to be burned as easily as gas for lighting purposes.

The carbonic acid is produced by the combustion of a mixture of coke and charcoal in a cast-iron receiver, where a respiratory and blowing machine continually introduces the air. This is the machine used in sugar-bakeries which work by the process of saturation —a machine known to every one, and which it is consequently unnecessary to describe.

The manufacture of the sulphuret of sodium is effected in two ways—viz., either by decomposing the sulphate of soda by charcoal or by decomposing the sulphate of soda by a soluble metallic or earthy sulphuret. I prefer preparing it by decomposing the sulphuret of barium by means of the sulphate of soda. I prepare the sulphuret of barium by heating in a reverberatory furnace natural sulphate of baryta with charcoal. I then afterward treat the solution of sulphuret of barium by a solution of sulphate of soda. I obtain a solution of sulphuret of sodium almost in a pure state and an artificial sulphate of baryta, of which there is a large consumption in the trade at this present time.

To free the sulphohydric acid from carbonic acid, I pass it, before turning it into the pyrite-furnaces, through a solution of sulphuret of barium, where the carbonic acid combines with the baryta and produces artificial carbonate of baryta, and the sulphohydric acid flows off in a state of purity.

The whole process may be summed up as putting in contact a solution of sulphuret of sodium, some cream of lime, and a current of carbonic acid. During the disengagement of the carbonic acid a beater armed with paddles keeps the matter constantly in motion, so as to prevent the deposit of the lime and of the oxysulphuret of calcium formed, and as far as possible to bring into contact the current of carbonic acid and the solution. A worm of steam heats the liquids in order to quicken the reactions and disengage as easily as possible the sulphohydric acid as soon as it is formed by preventing its dissolving in the solution of soda. By this process the labor is very simple. I dissolve in a boiler of sheet-iron or wood, by the aid of steam, the sulphuret of barium. Then, when the liquids have deposited their impurities, I filter them through an iron sieve containing fine gravel, intended to retain the impurities. I then decompose the liquids, which are well fined, by means of a solution, also well fined, of sulphate of soda. I heat the liquids and obtain a solution of sulphuret of sodium of a very pure kind and a precipitate of sulphate of artificial baryta, which it is sufficient to subject to several washings and dry in order to make fit for trade. I then introduce the clear solution of sulphuret of sodium, through the funnel I, into the first apparatus, H, as well as the cream of lime. During the introduction of the matters I open the little air-cock $i$ to prevent the formation of the vacuum. I then direct into the solution a current of carbonic acid produced by the coke-combustion apparatus, but not shown in the drawings. This current of carbonic acid comes through the tube M, which communicates by the aid of taps with all the apparatus. During the introduction of the carbonic acid the beater O O O O, armed with paddles turns constantly in order to keep all the matters in motion. The surplus acid passes from the first apparatus, H, into the second, H'; thence into the third, H''; thence into a fourth of a similar nature, and finally into a fifth, B, likewise of a similar kind and placed in the center. It is this latter which contains the solution of sulphuret of barium, intended to absorb the last traces of carbonic acid, and thus purify the sulphohydric acid. On leaving this last apparatus the sulphohydric acid passes into the receiver or gasometer D, and subsequently takes its way toward the pyrite-furnaces, where it is burned with the assistance of the row of gas-burners E, and becomes transformed into sulphurous acid. This acid is driven into the leaden chambers, where, by means of the ordinary process, it is transformed into sulphuric acid.

T T represent pipe or tube conducting the sulphohydric acid into the gasometer D; F F, tube conducting the sulphohydric acid of the gasometer into the pyrite-furnace, where it has to be consumed.

What I claim, and desire to secure by Letters Patent, is—

1. The formation of the carbonates of potash and soda by the transformation of the sulphurets of potassium and sodium into bicarbonates of the same bases, by the process and substantially in the manner described.

2. The manufacture of the sulphuret of sodium by the decomposition of the sulphuret of barium, substantially in the manner described.

3. The manufacture or production, by the process described, of the sulphate and carbonate of baryta.

4. The use of lime for the purpose and in the process described.

L. CHANDOR.

Witnesses:
 S. J. GORDON,
 GEO. H. COLLINS.